(12) United States Patent
Iskrev et al.

(10) Patent No.: US 10,703,475 B2
(45) Date of Patent: Jul. 7, 2020

(54) UNMANNED AERIAL VEHICLE

(71) Applicants: Yordan Iskrev, Rancho Cordova, CA (US); Boris Iskrev, Rancho Cordova, CA (US)

(72) Inventors: Yordan Iskrev, Rancho Cordova, CA (US); Boris Iskrev, Rancho Cordova, CA (US)

(73) Assignee: UVIONIX AEROSPACE CORPORATION, Rancho Cordova, CA (US)

( * ) Notice: Subject to any disclaimer, the term of this patent is extended or adjusted under 35 U.S.C. 154(b) by 481 days.

(21) Appl. No.: 15/493,248

(22) Filed: Apr. 21, 2017

(65) Prior Publication Data

US 2017/0305538 A1   Oct. 26, 2017

Related U.S. Application Data

(60) Provisional application No. 62/327,014, filed on Apr. 25, 2016.

(51) Int. Cl.
*B64C 39/02* (2006.01)

(52) U.S. Cl.
CPC ...... *B64C 39/024* (2013.01); *B64C 2201/108* (2013.01); *B64C 2201/162* (2013.01)

(58) Field of Classification Search
CPC ............ B64C 39/204; B64C 2201/162; B64C 2201/165; B64C 2201/108
See application file for complete search history.

(56) References Cited

U.S. PATENT DOCUMENTS

| | | | | |
|---|---|---|---|---|
| 8,464,511 B1* | 6/2013 | Ribarov | ............ | B64C 11/48 60/226.1 |
| 10,116,187 B1* | 10/2018 | Wishart | ............ | H02K 7/14 |
| 2014/0091172 A1* | 4/2014 | Arlton | ............ | B64C 27/14 244/17.23 |
| 2015/0008857 A1* | 1/2015 | Firanski | ............ | B64C 11/02 318/400.38 |
| 2018/0273166 A1* | 9/2018 | Arlton | ............ | B64C 27/14 |

* cited by examiner

*Primary Examiner* — Stephen Johnson
(74) *Attorney, Agent, or Firm* — Grogan, Tuccillo & Vanderleeden, LLP

(57) ABSTRACT

An unmanned aerial vehicle includes a tubular base structure, a motor having a stator, the stator being connected to the tubular base structure, an energy storage module configured to supply power to the motor, and at least one propeller driven by the motor, wherein the tubular base structure houses at least one cable for routing power or signals, or a fuel conduit or wire conduit.

20 Claims, 4 Drawing Sheets

UNMANNED AERIAL VEHICLE

CROSS-REFERENCE TO RELATED APPLICATIONS

This application claims the benefit of U.S. Provisional Application Ser. No. 62/327,014, filed on Apr. 25, 2016, which is hereby incorporated by reference herein in its entirety.

FIELD OF THE INVENTION

The present invention relates generally to aerial vehicles and, more particularly, to an unmanned aerial vehicle having a tubular base structure.

BACKGROUND OF THE INVENTION

An unmanned aerial vehicle (UAV), commonly known as a drone, is an aircraft without a human pilot aboard. Its flight is controlled either autonomously by onboard computers or by the remote control of a pilot on the ground or in another vehicle. UAVs are commonly used in military and special operations applications, and are increasingly finding uses in civil, commercial and recreational applications, such as policing and surveillance, aerial filming, and delivering of packages to end consumers.

Existing UAVs may be of the single rotor or dual coaxial rotor type, which provide a number of distinctive advantages over other UAV designs. For example these types of UAVs typically have a compact footprint, a small rotor disc surface area, and a small circumference, which makes them particularly suitable for a number of application where close interaction with people and reliable operation even with environment disturbances is essential.

One notable problem when designing single rotor or dual coaxial rotor UAVs is the inherent difficulty of the proper weight distribution throughout the UAV. Three important high-mass objects, the propulsion system (including the electric motor and propellers), the energy source module (typically a battery), and the cargo module (e.g., a cargo compartment, camera or other useful cargo/instrument the UAV transports), must often be taken into account, which affect the weight distribution of the UAV.

In view of the above, there is therefore a need for a UAV design in which the weight of the UAV is distributed in such a way as to minimize the inertial moment of the UAV.

SUMMARY OF THE INVENTION

It is an object of the present invention to provide an unmanned aerial vehicle.

It is another object of the present invention to provide an unmanned aerial vehicle in which the weight of the UAV is distributed in such a way as to minimize the inertial moment of the UAV.

It is another object of the present invention to provide an unmanned aerial vehicle that provides a shorter path for signal and/or power-carrying cables as compared to existing vehicles.

These and other objects are achieved by the present invention.

According to an embodiment of the present invention an unmanned aerial vehicle includes a tubular base structure, a motor having a stator, the stator being connected to the tubular base structure, an energy storage module configured to supply power to the motor, and at least one propeller driven by the motor, wherein the tubular base structure houses at least one cable for routing power or signals, or a fuel conduit or wire conduit.

According to another embodiment of the present invention, a method for minimizing the inertial moment of an unmanned aerial vehicle includes providing a tubular base structure having a generally hollow interior, an upper end and a lower end, equipping the tubular base structure with a motor and at least one propeller configured to be driven by the motor, connecting a hollow compartment to one of the upper end of the tubular base structure and the lower end of the tubular base structure, and connecting an energy storage module to the tubular base structure, the energy storage module being configured to supply power or fuel to the motor. The tubular base structure houses at least one cable for routing power or signals, or a fuel conduit or wire conduit.

According to yet another embodiment of the present invention, an unmanned aerial vehicle includes a tubular base structure having a generally hollow interior, an upper end and a lower end, an upper mounting fixture associated with the upper end, a lower mounting fixture associated with the lower end, a motor operatively connected to the tubular base structure, at least one propeller configured to be driven by the motor, a generally hollow compartment mounted to one of the upper mounting fixture and the lower mounting fixture, and an energy storage module mounted to the other of the upper mounting fixture and the lower mounting fixture.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
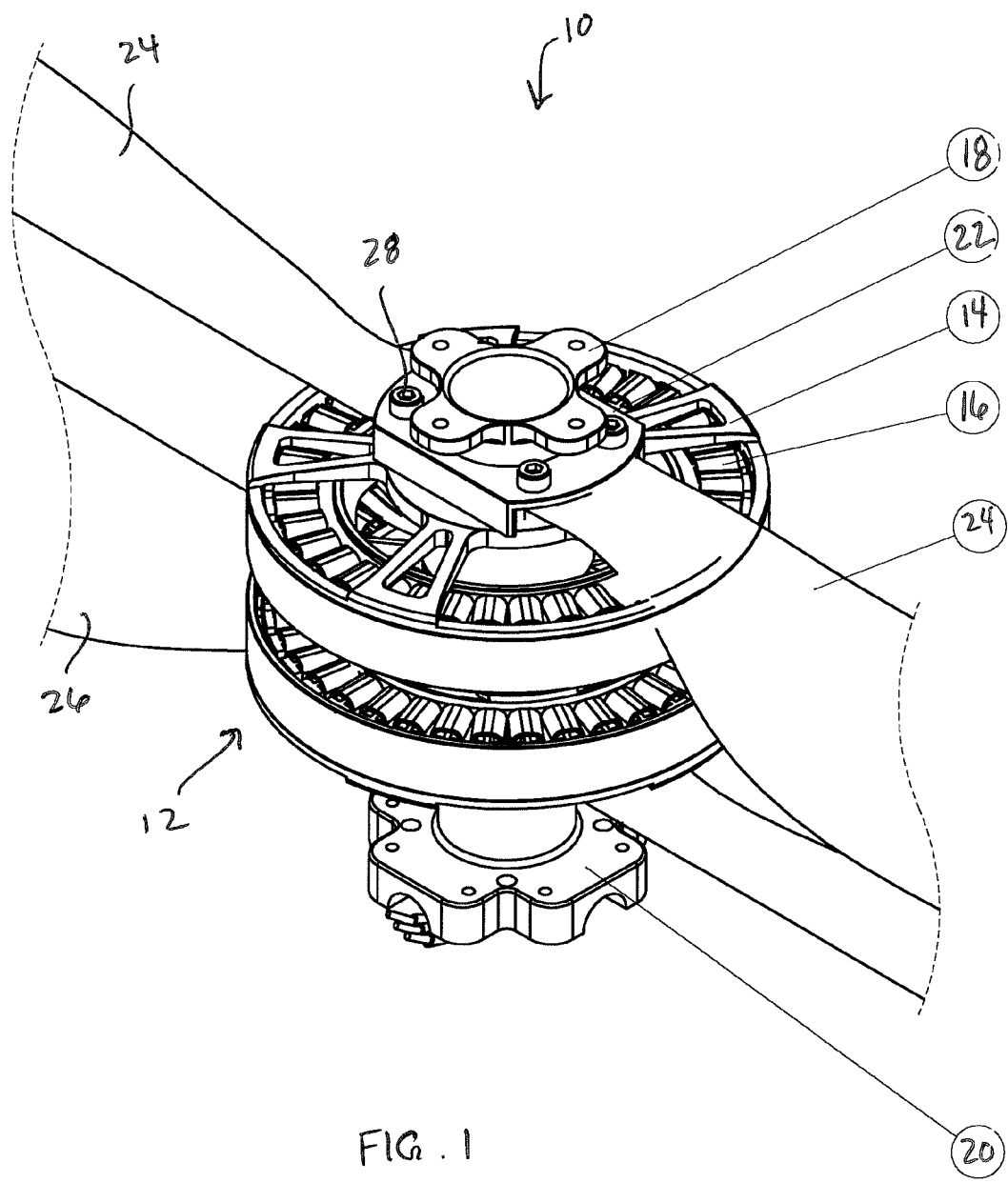
FIG. 1 is a perspective view of a portion of an unmanned aerial vehicle according to an embodiment of the present invention.
Figure 2:
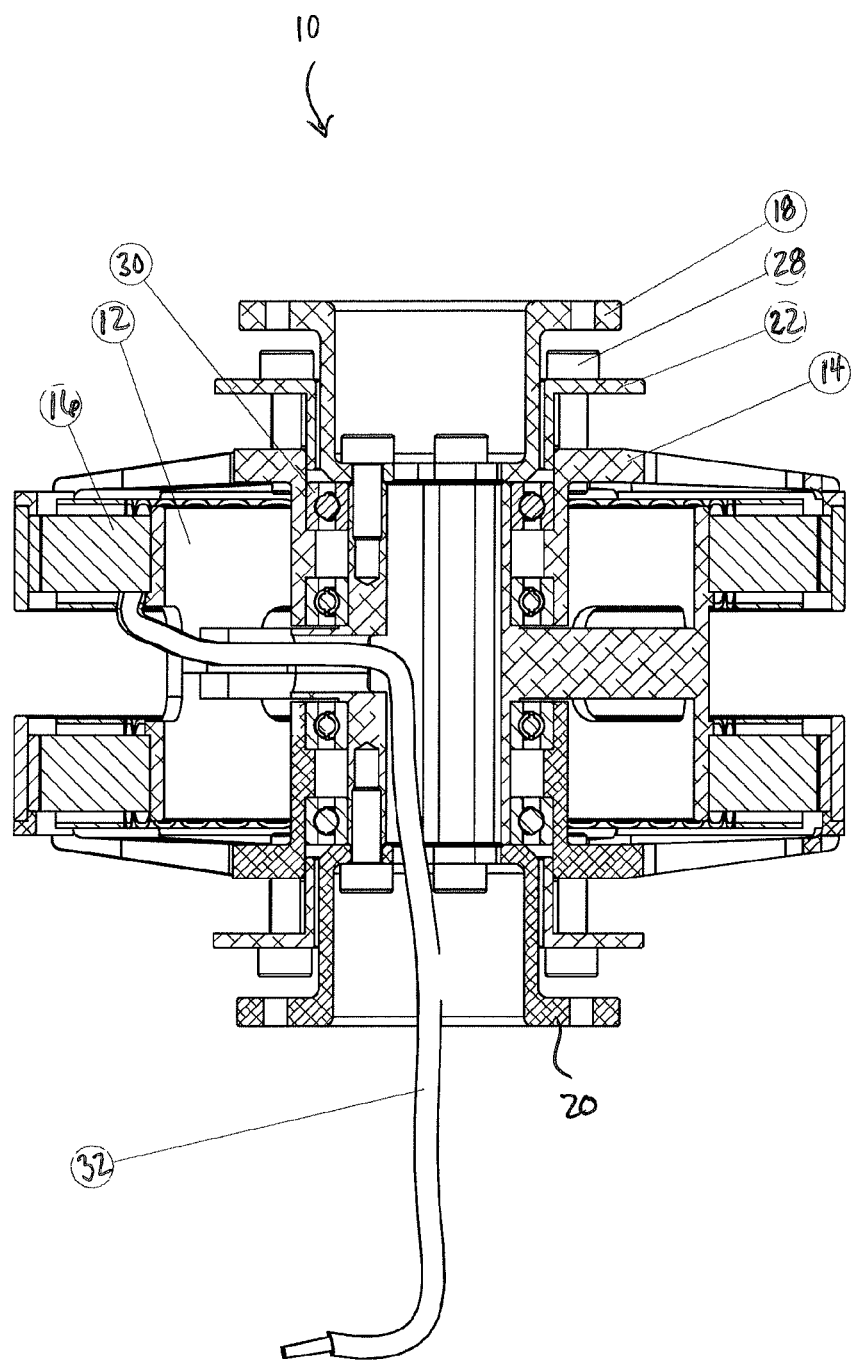
FIG. 2 is a cross-sectional view of the unmanned aerial vehicle of FIG. 1.
Figure 3:
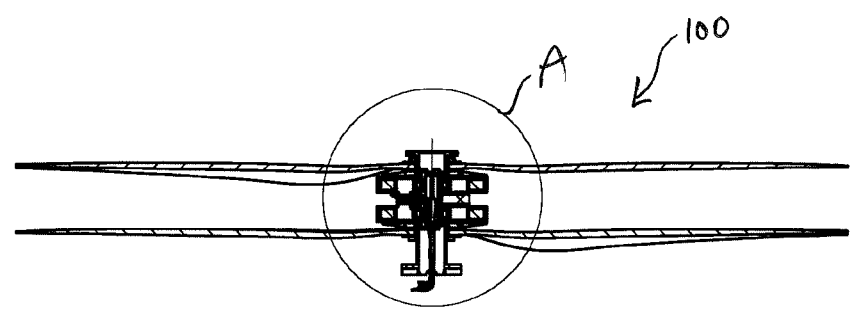
FIG. 3 is a side elevational view of an unmanned aerial vehicle, according to another embodiment of the present invention.
Figure 4:
FIG. 4 is a top plan view of the unmanned aerial vehicle of FIG. 3.
Figure 5:
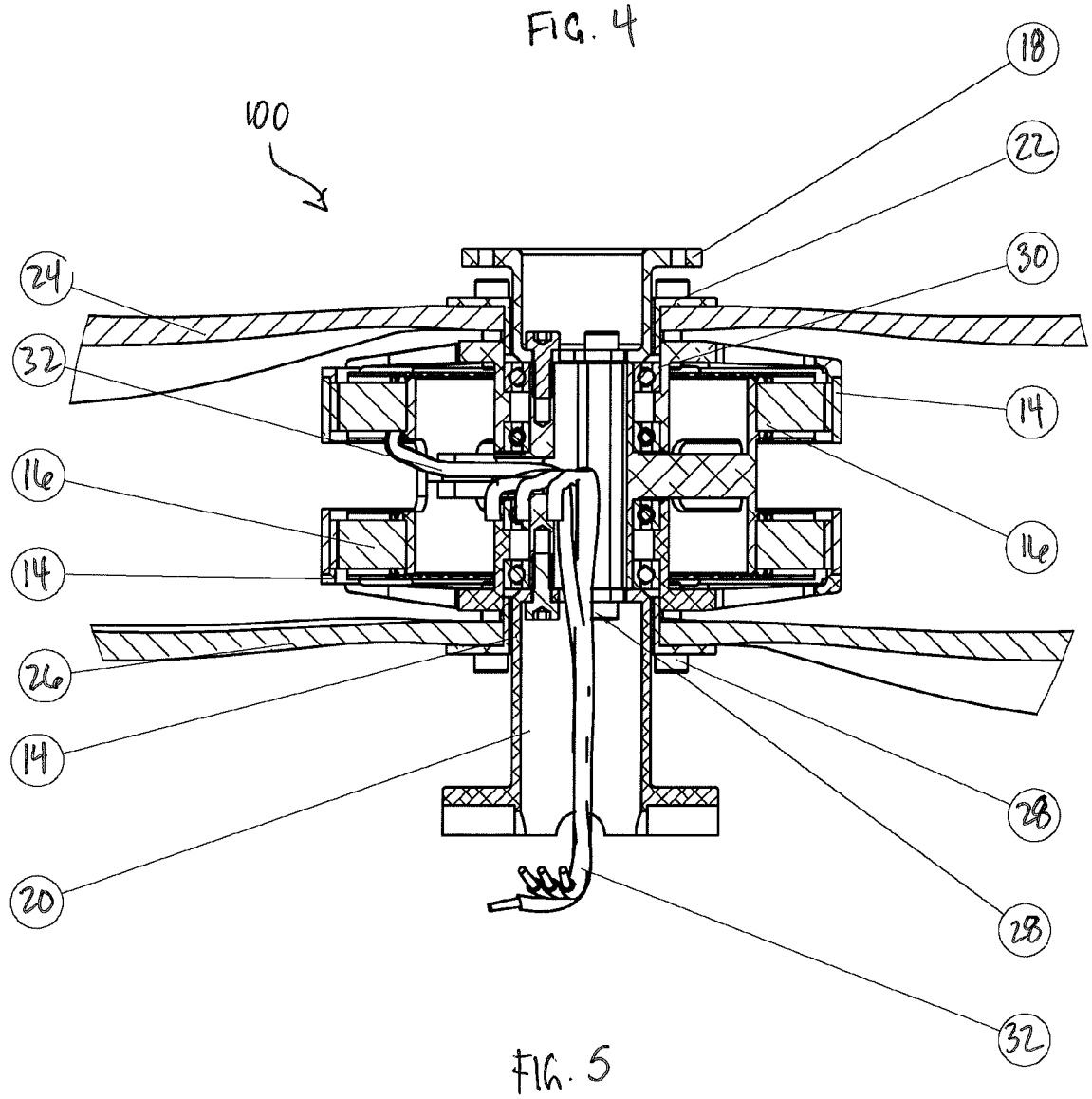
FIG. 5 is a cross-sectional view of area A of FIG. 3.

With reference to FIGS. 1 and 2, an unmanned aerial vehicle ("UAV") 10 according to an embodiment of the present invention is illustrated. The UAV 10 may generally take the form of any UAV known in the art. As illustrated therein, the UAV is depicted as a dual coaxial rotor UAV. The UAV 10 includes a tubular base structure 12 operatively connected to a motor having a rotor 14 and a stator 16. As best illustrated in FIG. 2, the tubular base structure 12 is rigidly attached to the stator of the motor (or to the stators of both motors in the case of a dual coaxial rotor). In an embodiment, the stator(s) 16 and the tubular base structure 12 are integrated into a single structure.

The tubular base structure 12 preferably includes, or is otherwise connected to, an upper flange 18 and a lower flange 20 (or similar mounting fixtures), the purposes of which will be described hereinafter. The tubular base 12 also includes a rotor flange 22 connected to the rotor 14, which is utilized to attach propellers 24, 26 to the rotor 14 using bolts 28 or other suitable fasteners. The tubular base structure 12 is spatially mounted along the center of rotation of the propellers 24, 26 of the UAV.

As also shown in FIG. 2, the unmanned aerial vehicle 10 includes a plurality of internal ball bearings 30 that facilitate rotation of the propellers 24, 26, and power cables 32 for connecting the motor coils to an electronic speed controller (not shown) for the motor.

Referring now to FIGS. 3-6, an unmanned aerial vehicle 100 according to another embodiment of the present invention is illustrated. The unmanned aerial vehicle 100 is substantially similar to the unmanned aerial vehicle 10 described above in connection with FIGS. 1 and 2, where like reference numerals designate like part.

Figure 6:
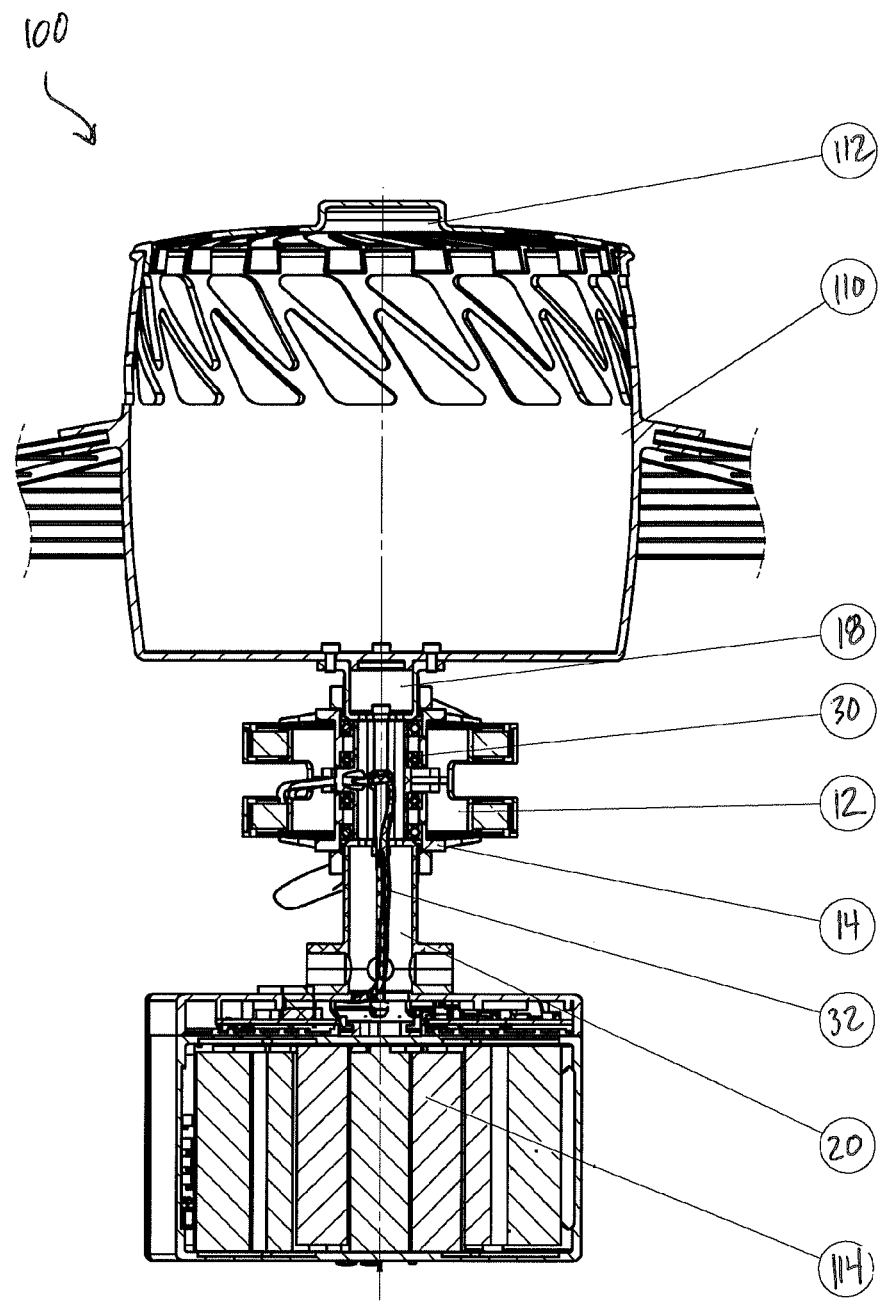
FIG. 6 is side, cross-sectional view of the unmanned aerial vehicle of FIG. 3, shown with a battery compartment and cargo compartment attached to the vehicle.

FIG. 6 shows the UAV 100 with a hollow cargo compartment 110 having a lid 112 and a energy source module 114 attached to the tubular base structure 12 via the upper and lower flanges 18, 20, respectively. The lower flange 20 may also be utilized to connect auxiliary electronics to the UAV. The cargo compartment 110 may be utilized to contain packages or other cargo for delivery to end customers.

In either of the embodiments described above, the tubular base structure 12 is manufactured from a lightweight material with high rigidity. Suitable materials may include impregnated carbon fiber, aluminum, magnesium or injection molded polymers (with or without reinforcement fillers) . In certain embodiments, the tubular base structure 12 may be manufactured with numerous openings for weight reduction and/or cable routing purposes. Importantly, the tubular base structure 12 is generally hollow and defines a vertical pathway therethrough, and is therefore particularly suitable for use for running power cables to the rotor motors of the UAV, for running power cables from the battery to the motor electronic speed controller module and/or other electronics, for routing signaling cables, and for various multi-purpose conduits. Moreover, the tubular base structure 12 serves as a base structure for the attachment of the energy source module 114, the cargo compartment 110 and control mechanisms.

Importantly, the configuration of the tubular base structure provides an as short as possible path to route the power cables from electronic speed control module(s) to the energy source module, and from the motor(s) to the electronic speed control module(s). It also provides an as short as possible path to route signal and/or power carrying cables from the upper subsection of the UAV to the lower subsection of the UAV, in the cases where different electronic components, and/or sensors and/or actuators are distributed in both the lower and the upper subsections. For all power cables this improves the efficiency and reduces the voltage drop; for all signal cables, this improves signal to noise ratio by reducing the noise.

In yet other embodiments, it is contemplated that the interior of the tubular base structure 12 can be utilized for at least partially integrating or housing the energy source module of the UAV (e.g., a battery or fuel tank). Importantly, positioning the energy source module within the tubular base structure 12 mitigates the offsetting effect that a top-mounted or bottom-mounted energy source module typically has on the center of mass of the UAV.

Importantly, the ability to pass cables through the tubular base structure, and the ability to house the energy storage module (e.g., battery, fuel tank, fuel cell, etc.) within the hollow base structure provides a more optimal weight distribution than existing vehicles. In particular, by locating the center of mass more closely to the geometric center of the UAV, inertial moments of the UAV can be minimized to an extent heretofore not seen in the art.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. An unmanned aerial vehicle, comprising:
a tubular base structure;
at least two motors, each said motor having a stator and a rotor, and having a central axis of rotation, the stator of each said motor being connected to the tubular base structure such that the central axis of rotation of each said motor coincides with a central axis of the tubular base structure;
an energy storage module configured to supply at least one of power or fuel to the at least two motors; and
at least one propeller affixed to each said motor, wherein the at least one propeller is driven by the motor;
wherein the tubular base structure defines a generally hollow passageway extending through the stator and the rotor of each said motor, the generally hollow passageway housing at least one cable for routing power or signals, or a fuel conduit or wire conduit.

2. The unmanned aerial vehicle of claim 1, wherein:
the tubular base structure includes an upper fixture and a lower fixture.

3. The unmanned aerial vehicle of claim 2, wherein:
the upper fixture is configured to receive a cargo compartment for mounting the cargo compartment to the tubular base structure.

4. The unmanned aerial vehicle of claim 3, wherein:
the lower fixture is configured to receive an energy storage module for mounting the energy storage module to the tubular base structure opposite the cargo compartment.

5. The unmanned aerial vehicle of claim 1, wherein:
the tubular base structure houses at least a portion of the energy storage module.

6. An unmanned aerial vehicle, comprising:
a tubular base structure;
a motor having a stator, the stator being connected to the tubular base structure;
an energy storage module configured to supply at least one of power or fuel to the motor; and
at least one propeller driven by the motor;
wherein the tubular base structure defines a generally hollow passageway and houses at least one cable for routing power or signals, or a fuel conduit or wire conduit;
wherein the tubular base structure houses at least a portion of the energy storage module; and wherein the energy storage module is positioned in the tubular base structure such that a center of mass of the unmanned aerial vehicle and a geometric center of the unmanned aerial vehicle are approximately the same.

7. The unmanned aerial vehicle of claim 5, wherein:
the energy storage module is one of a fuel tank, a battery or a fuel cell.

8. The unmanned aerial vehicle of claim 1, wherein:
the tubular base structure and the at least one cable extend substantially vertically.

9. The unmanned aerial vehicle of claim 2, wherein:
the lower fixture is configured to receive a control mechanism of the unmanned aerial vehicle.

10. A method for minimizing the inertial moment of an unmanned aerial vehicle, comprising the steps of:
providing a tubular base structure having a generally hollow interior, an upper end and a lower end;
equipping the tubular base structure with a motor and at least one propeller configured to be driven by the motor;
connecting a hollow compartment to one of the upper end of the tubular base structure and the lower end of the tubular base structure; and
connecting an energy storage module to the tubular base structure, the energy storage module being configured to supply power or fuel to the motor;
wherein the tubular base structure houses at least one cable for routing power or signals, or a fuel conduit or wire conduit; and
wherein a central axis of rotation of the motor coincides with a central axis of the tubular base structure.

11. The method according to claim 10, wherein:
the step of connecting the energy storage module to the tubular base structure includes connecting the energy storage module to the other of the upper end of the tubular base structure and the lower end of the tubular base structure.

12. The method according to claim 11, wherein:
the hollow compartment is connected to the upper end of the tubular base structure; and
the energy storage module is connected to the lower end of the tubular base structure.

13. The method according to claim 10, wherein:
the tubular base structure houses at least a portion of the energy storage module.

14. A method for minimizing the inertial moment of an unmanned aerial vehicle, comprising the steps of:
providing a tubular base structure having a generally hollow interior, an upper end and a lower end;
equipping the tubular base structure with a motor and at least one propeller configured to be driven by the motor;
connecting a hollow compartment to one of the upper end of the tubular base structure and the lower end of the tubular base structure;
connecting an energy storage module to the tubular base structure, the energy storage module being configured to supply power or fuel to the motor;
wherein the tubular base structure houses at least one cable for routing power or signals, or a fuel conduit or wire conduit;

wherein the tubular base structure houses at least a portion of the energy storage module; and
wherein the energy storage module is positioned in the tubular base structure such that a center of mass of the unmanned aerial vehicle and a geometric center of the unmanned aerial vehicle are approximately the same.

15. The method according to claim 12, wherein:
the energy storage module is one of a fuel tank, a battery or a fuel cell.

16. The method according to claim 10, wherein:
the tubular base structure and the at least one cable extend substantially vertically.

17. An unmanned aerial vehicle, comprising:
a tubular base structure having a generally hollow interior, an upper end and a lower end;
an upper mounting fixture associated with the upper end;
a lower mounting fixture associated with the lower end;
a motor operatively connected to the tubular base structure;
at least one propeller configured to be driven by the motor;
a generally hollow compartment mounted to one of the upper mounting fixture and the lower mounting fixture; and
an energy storage module mounted to the other of the upper mounting fixture and the lower mounting fixture;
wherein a central axis of rotation of the motor coincides with a central axis of the tubular base structure.

18. The unmanned aerial vehicle of claim 17, further comprising:
at least one cable or conduit extending substantially vertically between the energy storage module and the motor through the tubular base structure, the at least one cable or conduit being configured to supply electrical energy or fuel to the motor.

19. An unmanned aerial vehicle, comprising:
a tubular base structure having a generally hollow interior, an upper end and a lower end;
an upper mounting fixture associated with the upper end;
a lower mounting fixture associated with the lower end;
a motor operatively connected to the tubular base structure;
at least one propeller configured to be driven by the motor;
a generally hollow compartment mounted to one of the upper mounting fixture and the lower mounting fixture; and
an energy storage module mounted to the other of the upper mounting fixture and the lower mounting fixture;
wherein the tubular base structure houses at least a portion of the energy storage module such that a center of mass of the unmanned aerial vehicle and a geometric center of the unmanned aerial vehicle are approximately the same.

20. The unmanned aerial vehicle of claim 18, wherein:
the lower mounting fixture is configured to receive a control mechanism of the unmanned aerial vehicle; and
a cable for routing signals between the control mechanism and the motor extends substantially vertically between the control mechanism and the motor through the tubular base structure.

* * * * *